US012795460B2

(12) United States Patent
Jung et al.

(10) Patent No.: US 12,795,460 B2
(45) Date of Patent: Nov. 10, 2026

(54) GROUP-BASED MOBILITY CONFIGURATION

(71) Applicant: Lenovo (Singapore) Pte. Ltd., New Tech Park (SG)

(72) Inventors: Hyejung Jung, Northbrook, IL (US); Joachim Löhr, Wiesbaden (DE); Hyung-Nam Choi, Ottobrunn (DE); Sher Ali Cheema, Ilmenau (DE); Majid Ghanbarinejad, Chicago, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 291 days.

(21) Appl. No.: 18/291,523

(22) PCT Filed: Jul. 22, 2022

(86) PCT No.: PCT/IB2022/056812
§ 371 (c)(1),
(2) Date: Jan. 23, 2024

(87) PCT Pub. No.: WO2023/002454
PCT Pub. Date: Jan. 26, 2023

(65) Prior Publication Data
US 2024/0349129 A1 Oct. 17, 2024

Related U.S. Application Data

(60) Provisional application No. 63/225,265, filed on Jul. 23, 2021.

(51) Int. Cl.
*H04W 36/00* (2009.01)

(52) U.S. Cl.
CPC ................................ *H04W 36/0009* (2018.08)

(58) Field of Classification Search
CPC ......... H04W 36/0009; H04W 74/0841; H04W 74/0833; H04W 24/08; H04W 74/006; H04W 48/02
See application file for complete search history.

(56) References Cited

U.S. PATENT DOCUMENTS

2019/0037449 A1 1/2019 Fujishiro et al.
2019/0098698 A1 3/2019 Fukuta
(Continued)

OTHER PUBLICATIONS

PCT/IB2022/056812, "Notification of Transmittal of the International Search Report and the Written Opinion of the International Searching Authority, or the Declaration", International Searching Authority, Oct. 31, 2022, pp. 1-14.
(Continued)

*Primary Examiner* — Anez C Ebrahim
(74) *Attorney, Agent, or Firm* — Kunzler Needham Hilton

(57) ABSTRACT

Apparatuses and methods are disclosed for group-based mobility configuration. A user equipment (UE) (600) includes a transceiver (625) and a processor (605) coupled to the transceiver (625). The processor (605) is configured to cause the UE (600) to receive a group handover configuration comprising a first identifier and a second identifier, the first identifier for a group of UE apparatuses and the second identifier for the UE apparatus within the group of UE apparatuses. In one embodiment, the processor (605) is configured to cause the UE (600) to receive a group handover command message based on the first identifier. In one embodiment, the processor (605) is configured to cause the UE (600) to perform handover of the UE apparatus to a target cell in response to determining that the group handover command comprises handover information for the UE apparatus based on the second identifier.

20 Claims, 9 Drawing Sheets

(56) References Cited

U.S. PATENT DOCUMENTS

2023/0023214 A1* 1/2023 Shrestha ........... H04W 74/0841
2023/0239763 A1* 7/2023 Wei ................. H04W 36/00837 370/331
2023/0247685 A1* 8/2023 Choe ..................... H04W 76/10 370/329

OTHER PUBLICATIONS

Mediatek Inc., "Grouping and Automatic Reconfiguration for Handover Enhancement in LEO NTN", 3GPP TSG-RAN WG2 Meeting #107-Bis Tdoc R2-1912923, Oct. 14-18, 2019, pp. 1-7.
Mediatek Inc., "Broadcast Handover in LEO-Satellite based NTN", 3GPP TSG-RAN WG2 Meeting #107-Bis Tdoc R2-1912964, Oct. 14-18, 2019, pp. 1-3.
3GPP, "3rd Generation Partnership Project; Technical Specification Group Radio Access Network; NR; Requirements for support of radio resource management (Release 17)", 3GPP TS 38.133 V17. 2.0, Jun. 2021, pp. 1-3177.
3GPP, "3rd Generation Partnership Project; Technical Specification Group Radio Access Network; NR; Physical layer procedures for control (Release 16)", 3GPP TS 38.213 V16.6.0, Jun. 2021, pp. 1-187.
3GPP, "3rd Generation Partnership Project; Technical Specification Group Radio Access Network; NR; Medium Access Control (MAC) protocol specification (Release 16)", 3GPP TS 38.321 V16.5.0, Jun. 2021, pp. 1-157.
3GPP, "3rd Generation Partnership Project; Technical Specification Group Radio Access Network; NR; Radio Link Control (RLC) protocol specification (Release 16)", 3GPP TS 38.322 V16.2.0, Dec. 2020, pp. 1-33.
3GPP, "3rd Generation Partnership Project; Technical Specification Group Radio Access Network; NR; Packet Data Convergence Protocol (PDCP) specification (Release 16)", 3GPP TS 38.323 V16.4.0, Jun. 2021, pp. 1-40.
3GPP, "3rd Generation Partnership Project; Technical Specification Group Radio Access Network; NR; Radio Resource Control (RRC) protocol specification (Release 16)", 3GPP TS 38.331 V16.5.0, Jun. 2021, pp. 1-959.
3GPP, "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.5.0, Jun. 2021, pp. 1-1091.

* cited by examiner

```
-- ASN1START
-- TAG-GROUPRRCRECONFIGURATION-START

GroupRRCReconfiguration ::=          SEQUENCE {
   rrc-TransactionIdentifier          RRC-TransactionIdentifier,
   criticalExtensions                 CHOICE {
      groupRRCReconfiguration            GroupRRCReconfiguration-IEs,
      criticalExtensionsFuture           SEQUENCE {}
   }
}

GroupRRCReconfiguration-IEs ::=          SEQUENCE {
   masterCellGroup              OCTET STRING (CONTAINING GroupBasedCellGroupConfig)
OPTIONAL, -- Need M
   secondaryCellGroup              OCTET STRING (CONTAINING GroupBasedCellGroupConfig)
OPTIONAL, -- Cond SCG
   fullConfig                ENUMERATED {true}                    OPTIONAL, --
Cond FullConfig
   measConfig                  MeasConfig                        OPTIONAL, --
Need N
   dedicatedSIB1-Delivery             OCTET STRING (CONTAINING SIB1)
OPTIONAL, -- Need N
   dedicatedSystemInformationDelivery     OCTET STRING (CONTAINING SystemInformation)
OPTIONAL, -- Need N

   t316-r16                    SetupRelease {T316-r16}                   OPTIONAL, --
Need M
   needForGapsConfigNR-r16             SetupRelease {NeedForGapsConfigNR-r16}
OPTIONAL, -- Need M
   onDemandSIB-Request-r16             SetupRelease { OnDemandSIB-Request-r16 }
OPTIONAL, -- Need M
   dedicatedPosSysInfoDelivery-r16       OCTET STRING (CONTAINING PosSystemInformation-
r16-IEs)          OPTIONAL, -- Need N

   nonCriticalExtension              SEQUENCE {}                          OPTIONAL
}

OnDemandSIB-Request-r16 ::=            SEQUENCE {
   onDemandSIB-RequestProhibitTimer-r16       ENUMERATED {s0, s0dot5, s1, s2, s5, s10, s20,
s30}
}

T316-r16 ::=       ENUMERATED {ms50, ms100, ms200, ms300, ms400, ms500, ms600, ms1000,
ms1500, ms2000}

-- TAG-GROUPRRCRECONFIGURATION-STOP

-- ASN1STOP
```

FIG. 3

```
-- ASN1START
-- TAG-GROUPBASEDCELLGROUPCONFIG-START

-- Configuration of one Cell-Group:
GroupBasedCellGroupConfig ::=                SEQUENCE {
   cellGroupId                     CellGroupId,
   groupSpCellConfig                   GroupSpCellConfig
OPTIONAL,   -- Need M
   [[
   reportUplinkTxDirectCurrentTwoCarrier-r16  ENUMERATED {true}
OPTIONAL    -- Need N
   ]]
}

-- Serving cell specific MAC and PHY parameters for a SpCell:
GroupSpCellConfig ::=                SEQUENCE {
   servCellIndex                ServCellIndex                          OPTIONAL,   -- Cond
SCG
   groupReconfigurationWithSync       GroupReconfigurationWithSync
OPTIONAL,   -- Cond GroupReconfWithSync
   rlf-TimersAndConstants            SetupRelease { RLF-TimersAndConstants }
OPTIONAL,   -- Need M
   rlmInSyncOutOfSyncThreshold        ENUMERATED {n1}                          OPTIONAL,
-- Need S
}

GroupReconfigurationWithSync ::=        SEQUENCE {
   spCellConfigCommon              ServingCellConfigCommon                        OPTIONAL,
-- Need M

     downlinkBWPList       SEQUENCE (SIZE (1..maxNrofBWPs)) OF BWP-Downlink
OPTIONAL,   -- Cond SyncAndCellAdd

     TCI-StateList         SEQUENCE (SIZE (1..maxNrofTCI-States)) OF TCI-StateId
OPTIONAL,   -- Cond SyncAndCellAdd

   groupUplinkConfig                  GroupUplinkConfig
OPTIONAL,   -- Need M
   groupSupplementaryUplink             GroupUplinkConfig
OPTIONAL,   -- Need M

     mobilityConfigList              SEQUENCE (SIZE (1..maxNrofUEsPerGroup)) OF MobilityConfig,
   t304A                      ENUMERATED {ms50, ms100, ms150, ms200, ms500, ms1000,
ms2000, ms10000},
   ...,
   [[
   smtc                       SSB-MTC                                 OPTIONAL    -- Need S
```

FIG. 4A

```
   ]],
   [[
   daps-UplinkPowerConfig-r16     DAPS-UplinkPowerConfig-r16                    OPTIONAL
-- Need N
   ]]
}

GroupUplinkConfig ::=                SEQUENCE {
     uplinkBWPList        SEQUENCE (SIZE (1..maxNrofBWPs)) OF BWP-Uplink
OPTIONAL,   -- Cond SyncAndCellAdd
   uplinkChannelBW-PerSCS-List        SEQUENCE (SIZE (1..maxSCSs)) OF SCS-SpecificCarrier
OPTIONAL    -- Need S
}

MobilityConfig            SEQUENCE {
         mobilityConfigID                       UE-IndexforGroupMobility,
      newUE-Identity                   RNTI-Value,
         t304A-Offset                           ENUMERATED {ms10, ms20, ms40, ms80}
     OPTIONAL

      syncConfig                           RACH-ConfigDedicated  OPTIONAL,   -- Need N
     firstActiveDownlinkBWP-Id         BWP-Id,       OPTIONAL,   -- Cond SyncAndCellAdd
         firstActiveUplinkBWP-Id           BWP-Id      OPTIONAL,   -- Cond SyncAndCellAdd
   }

UE-IndexforGroupMobility ::=      INTEGER (1..maxNrofUEsPerGroup )

rach-ConfigDedicated              CHOICE {
      uplink                      RACH-ConfigDedicated,
      supplementaryUplink              RACH-ConfigDedicated
   }

DAPS-UplinkPowerConfig-r16 ::=      SEQUENCE {
   p-DAPS-Source-r16               P-Max,
   p-DAPS-Target-r16               P-Max,
   uplinkPowerSharingDAPS-Mode-r16     ENUMERATED {semi-static-mode1, semi-static-mode2,
dynamic }
}

-- TAG-GROUPBASEDCELLGROUPCONFIG-STOP
-- ASN1STOP
```

FIG. 4B

GROUP-BASED MOBILITY CONFIGURATION

CROSS-REFERENCE TO OTHER APPLICATIONS

This application claims the benefit of U.S. Provisional Patent Application No. 63/225,265, entitled "GROUP BASED MOBILITY CONFIGURATION" and filed on Jul. 23, 2021, for Hyejung Jung et al., which is incorporated herein by reference.

FIELD

The subject matter disclosed herein relates generally to wireless communications and more particularly relates to group-based mobility configuration.

BACKGROUND

In wireless networks, group-based mobility—changing a primary cell of a group of user equipment devices ("UEs") simultaneously—may be useful for various scenarios, e.g., non-terrestrial network ("NTN") feeder link switching, off-loading a large number of UEs connected with one cell to a neighboring cell in order to turn off a network node for power saving, a change of a serving cell for a mobile integrated access backhaul ("IAB")-node, and/or the like.

BRIEF SUMMARY

Disclosed are solutions for group-based mobility configuration. The solutions may be implemented by apparatus, systems, methods, or computer program products.

In one embodiment, a first apparatus includes a transceiver and a processor coupled to the transceiver. In one embodiment, the processor is configured to cause the apparatus to receive a group handover configuration comprising a first identifier and a second identifier, the first identifier for a group of UE apparatuses and the second identifier for the UE apparatus within the group of UE apparatuses. In one embodiment, the processor is configured to cause the apparatus to receive a group handover command message based on the first identifier. In one embodiment, the processor is configured to cause the apparatus to perform handover of the UE apparatus to a target cell in response to determining that the group handover command comprises handover information for the UE apparatus based on the second identifier.

In one embodiment, a first method receives a group handover configuration comprising a first identifier and a second identifier, the first identifier for a group of UE apparatuses and the second identifier for the UE apparatus within the group of UE apparatuses. In one embodiment, the first method receives a group handover command message based on the first identifier. In one embodiment, the first method performs handover of the UE apparatus to a target cell in response to determining that the group handover command comprises handover information for the UE apparatus based on the second identifier.

In one embodiment, a second apparatus includes a transceiver and a processor coupled to the transceiver. In one embodiment, the processor is configured to cause the apparatus to transmit, to a UE apparatus, a group handover configuration comprising a first identifier and a second identifier, the first identifier for a group of UE apparatuses and the second identifier for the UE apparatus within the group of UE apparatuses. In one embodiment, the processor is configured to cause the apparatus to generate a group handover command message based on the first identifier, the group handover command message comprising handover information for the UE apparatus indicated based on the second identifier. In one embodiment, the processor is configured to cause the apparatus to transmit, to the UE apparatus, the group handover command message based on the first identifier, wherein the UE apparatus performs handover of the UE apparatus to a target cell in response to determining that the group handover command comprises handover information for the UE apparatus based on the second identifier.

In one embodiment, a second method transmits, to a UE apparatus, a group handover configuration comprising a first identifier and a second identifier, the first identifier for a group of UE apparatuses and the second identifier for the UE apparatus within the group of UE apparatuses. In one embodiment, the second method generates a group handover command message based on the first identifier, the group handover command message comprising handover information for the UE apparatus indicated based on the second identifier. In one embodiment, the second method transmits, to the UE apparatus, the group handover command message based on the first identifier, wherein the UE apparatus performs handover of the UE apparatus to a target cell in response to determining that the group handover command comprises handover information for the UE apparatus based on the second identifier.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 depicts one example embodiment of a GroupRRCReconfiguration message IE;

FIG. 4A depicts one example embodiment of a GroupBasedCellGroupConfig IE;

FIG. 4B is a continuation of FIG. 4A;

DETAILED DESCRIPTION

Figure 1:
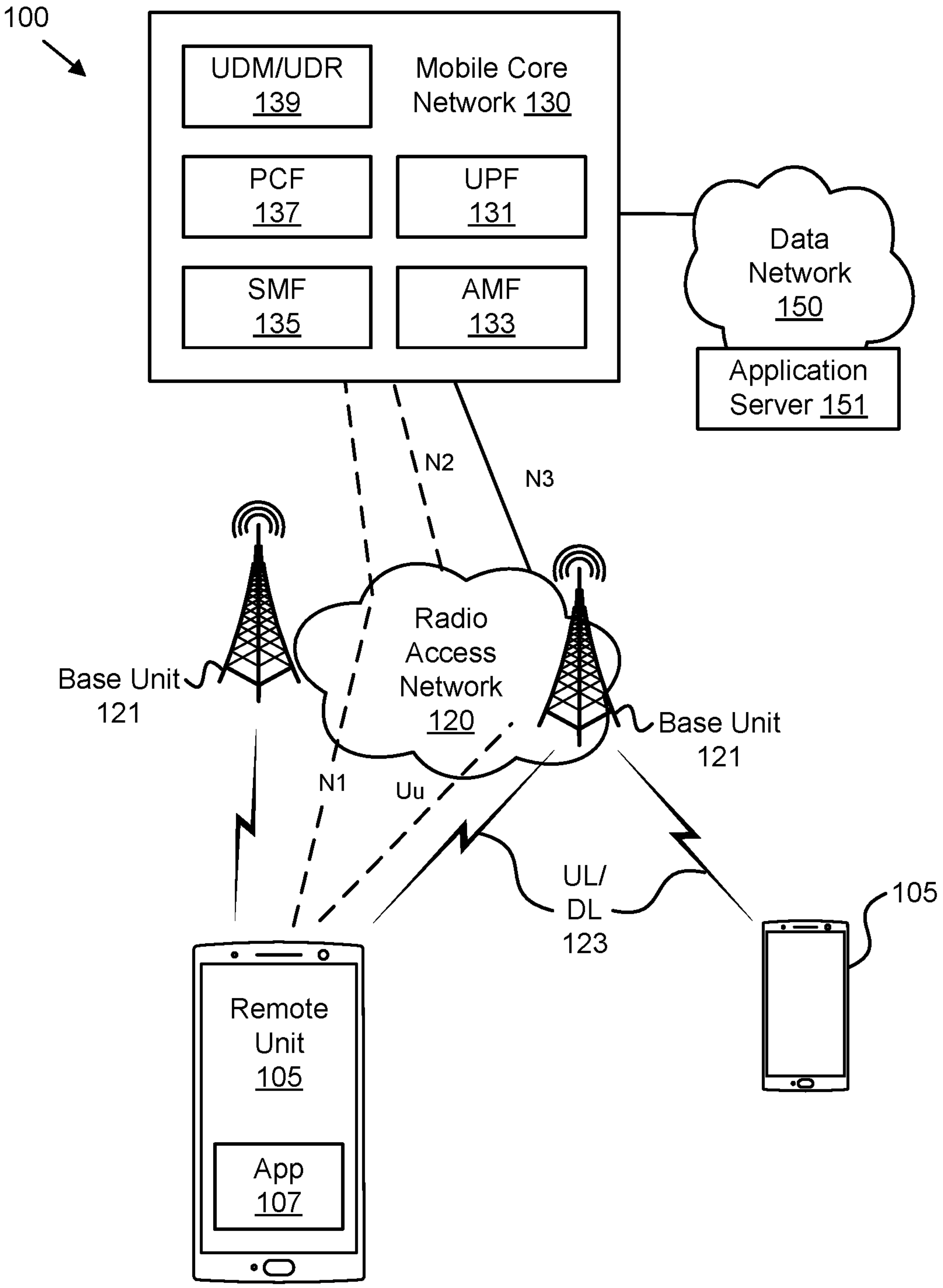
FIG. 1 is a schematic block diagram illustrating one embodiment of a wireless communication system for group-based mobility configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for group-based mobility configuration. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Group-based mobility (e.g., changing a primary cell of a group of UEs simultaneously) may be useful for various scenarios, e.g., non-terrestrial network ("NTN") feeder link switching, offloading a large number of UEs connected with one cell to a neighboring cell in order to turn off a network node for power saving, and a change of a serving cell for a mobile IAB-node.

For example, in NTN, it may be necessary to switch a feeder link of a satellite from one NTN gateway ("GW") to another. This may be due to, e.g., maintenance, traffic offloading, or the satellite moving out of visibility with respect to the current NTN GW. The switchover should be performed without causing service disruption to served UEs. In one NTN architecture, gNBs are on the ground (terrestrial), thus the feeder link switch means a switch from a gNB1 to a gNB2. That is, all or a majority UEs served by the satellite/gNB1 may have to perform handover in short duration to gNB2. Similar to NTN feeder link switching, a mobile IAB-node may have to switch from one parent IAB-node or one IAB-donor to another and, accordingly, may have to change an IAB-DU cell configuration (e.g., cell identity, SSB beams). In such a scenario, all UEs and/or a child IAB-nodes served by the IAB-DU cell may have to perform handover in short time.

In another example, when a network node provides overlapped coverage with another network node and/or traffic load is light, it may be beneficial to turn off or put in a dormant state the network node for network power saving. Before turning off a cell, a number of UEs served by the cell may need to be moved by handover to another cell in short time.

In Rel-15/16 NR, an RRC-connected UE can receive a conditional handover ("CHO") command for robust handover. One drawback of CHO is that a network entity may have to reserve one or more physical random access channel ("PRACH") resources for each UE until handover is triggered by a UE. If a significant percentage of UEs in a source cell are configured with CHO to a particular target cell, it may be difficult to efficiently utilize PRACH resources and may increase PRACH collisions for idle UEs in the target cell. Further, an RRC signaling overhead for handover commands is expected to be high with individual delivery of handover commands to a large number of UEs.

This disclosure presents detailed signaling methods to enable group-based serving cell change. In some embodiments, the proposed group-based mobility configuration allows a large number of UEs to perform handover with reduced signaling overhead. Different handover initiation time for different UEs in a group can solve a potential PRACH capacity issue in a target cell.

FIG. 1 depicts a wireless communication system 100 supporting group-based mobility configuration, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 115. Even though a specific number of remote units 105, base units 121, wireless communication links 115, RANs 120, and mobile core networks 130 are depicted in FIG. 1, one of skill in the art will recognize that any number of remote units 105, base units 121, wireless communication links 115, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a New Generation Radio Access Network ("NG-RAN"), implementing NR RAT and/or 3GPP Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN

120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130.

In some embodiments, the remote units 105 communicate with an application server via a network connection with the mobile core network 130. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server (e.g., the content server 151 in the packet data network 150) using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150, e.g., representative of the Internet. The remote unit 105 may establish additional PDU sessions for communicating with other data networks and/or other communication peers.

In the context of a 5G system ("5GS"), the term "PDU Session" a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Network Exposure Function ("NEF"), a Policy Control Function ("PCF") 137, a Unified Data Management function ("UDM") and a User Data Repository ("UDR") 139.

The UPF(s) 131 is responsible for packet routing and forwarding, packet inspection, QoS handling, and external PDU session for interconnecting Data Network ("DN"), in the 5G architecture. The AMF 133 is responsible for termination of NAS signaling, NAS ciphering & integrity protection, registration management, connection management, mobility management, access authentication and authorization, security context management. The SMF 135 is responsible for session management (i.e., session establishment, modification, release), remote unit (i.e., UE) IP address allocation & management, DL data notification, and traffic steering configuration for UPF for proper traffic routing.

The NEF is responsible for making network data and resources easily accessible to customers and network partners. Service providers may activate new capabilities and expose them through APIs. These APIs allow third-party authorized applications to monitor and configure the network's behavior for a number of different subscribers (i.e., connected devices with different applications). The PCF 137 is responsible for unified policy framework, providing policy rules to CP functions, access subscription information for policy decisions in UDR.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI,") while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed. Where different network slices are deployed, the mobile core network 130 may include a Network Slice Selection Function ("NSSF") which is responsible for selecting of the Network Slice instances to serve the remote unit 105, determining the allowed NSSAI, determining the AMF set to be used to serve the remote unit 105.

Although specific numbers and types of network functions are depicted in FIG. 1, one of skill in the art will recognize that any number and type of network functions may be included in the mobile core network 130. Moreover, in an LTE variant where the mobile core network 130 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments apply to other types of communication networks and RATs, including IEEE 802.11 variants, Global System for Mobile Communications ("GSM", i.e., a 2G digital cellular network), General Packet Radio Service ("GPRS"), UMTS, LTE variants, CDMA 2000, Bluetooth, ZigBee, Sigfox, and the like.

In the following descriptions, the term "gNB" is used for the base station but it is replaceable by any other radio access node, e.g., RAN node, eNB, Base Station ("BS"), Access Point ("AP"), NR, etc. Further the operations are described mainly in the context of 5G NR. However, the proposed solutions/methods are also equally applicable to other mobile communication systems supporting CSI enhancements for higher frequencies.

Figure 2:
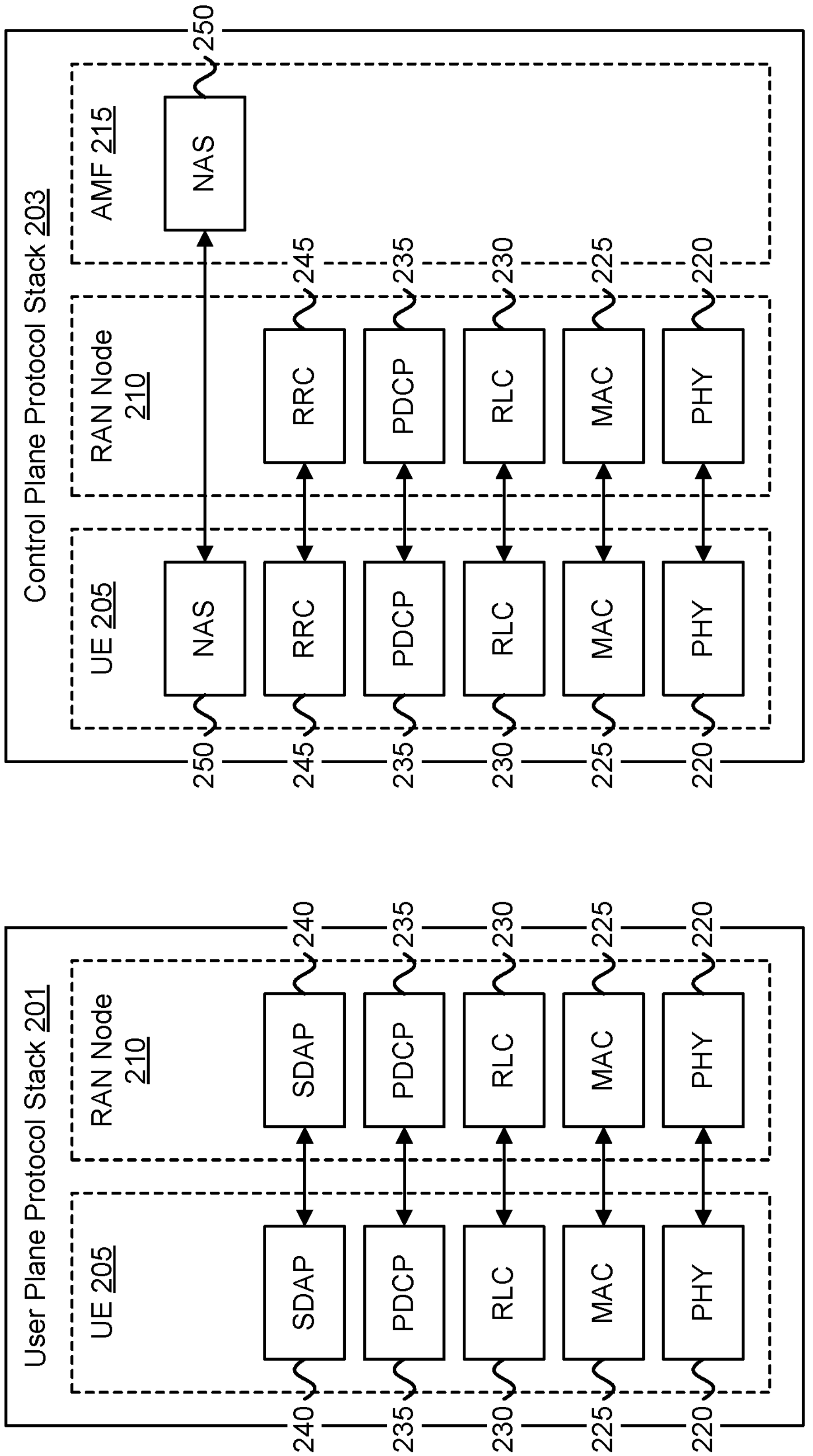
FIG. 2 is a diagram illustrating one embodiment of a NR protocol stack.

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a Medium Access Control ("MAC") sublayer 225, the Radio Link Control ("RLC") sublayer 230, a Packet Data Convergence Protocol ("PDCP") sublayer 235, and a Service Data Adaptation Protocol ("SDAP") sublayer 240. The Control Plane protocol stack 203 includes a physical layer 220, a MAC sublayer 225, a RLC sublayer 230, and a PDCP sublayer 235. The Control Plane protocol stack 203 also includes a Radio Resource Control ("RRC") sublayer 245 and a Non-Access Stratum ("NAS") sublayer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a Clear Channel Assessment and/or Listen-Before-Talk ("CCA/LBT") procedure using energy detection thresholds, as described herein. In certain embodiments, the physical layer 220 may send a notification of UL Listen-Before-Talk ("LBT") failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QOS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (e.g., RAN node 210) and carries information over the wireless portion of the network.

As background, in NR, a handover command is provided by a gNB using the RRCReconfiguration message including the parameter reconfigurationWithSync. Radio resource control ("RRC") reconfiguration procedure, including the parameter reconfigurationWithSync (e.g., change of special cell ("SpCell") of master cell group ("MCG") or secondary cell group ("SCG")) in Rel-16 NR is described as follows:

Regarding reception of an RRCReconfiguration by the UE, e.g. as described in TS 38.331, the UE shall perform the following actions upon reception of the RRCReconfiguration, or upon execution of the conditional reconfiguration (CHO or CPC):

---

1> if the RRCReconfiguration is applied due to a conditional reconfiguration execution upon cell selection while timer T311 is running, e.g., as defined in 5.3.7.3:
2> remove all the entries within VarConditionalReconfig, if any;
1> if the RRCReconfiguration includes the daps-SourceRelease:
2> reset the source medium access control ("MAC") and release the source MAC configuration;
2> for each dual active protocol stack ("DAPS") bearer:
3> release the radio link control ("RLC") entity or entities as specified in TS 38.322, clause 5.1.3, and the associated logical channel for the source SpCell;
3> reconfigure the packet data convergence protocol ("PDCP") entity to release DAPS as specified in TS 38.323;
2> for each signaling radio bearer ("SRB"):
3> release the PDCP entity for the source SpCell;
3> release the RLC entity as specified in TS 38.322, clause 5.1.3, and the associated logical channel for the source SpCell;
2> release the physical channel configuration for the source SpCell;
2> discard the keys used in the source SpCell (the $K_{gNB}$ key, the $K_{RRCenc}$ key, the $K_{RRCint}$ key, the $K_{UPint}$ key and the $K_{UPenc}$ key), if any;
1> if the RRCReconfiguration is received via other RAT (e.g., inter-RAT handover to NR):
2> if the RRCReconfiguration does not include the fullConfig and the UE is connected to 5GC (i.e., delta signalling during intra 5GC handover):
3> re-use the source RAT service data adaptation protocol ("SDAP") and PDCP configurations if available (e.g., current SDAP/PDCP configurations for all resource blocks ("RBs") from source evolved universal terrestrial radio access ("E-UTRA") RAT prior to the reception of the inter-RAT HO RRCReconfiguration message);
1> else:
2> if the RRCReconfiguration includes the fullConfig:
3> perform the full configuration procedure as specified in 5.3.5.11;
1> if the RRCReconfiguration includes the masterCellGroup:
2> perform the cell group configuration for the received masterCellGroup according to 5.3.5.5;
1> if the RRCReconfiguration includes the masterKeyUpdate:
2> perform access stratum ("AS") security key update procedure as specified in 5.3.5.7;
1> if the RRCReconfiguration includes the sk-Counter:
2> perform security key update procedure as specified in 5.3.5.7;
1> if the RRCReconfiguration includes the secondaryCellGroup:
2> perform the cell group configuration for the SCG according to 5.3.5.5;
1> if the RRCReconfiguration includes the mrdc-SecondaryCellGroupConfig:
2> if the mrdc-SecondaryCellGroupConfig is set to setup:
3> if the mrdc-SecondaryCellGroupConfig includes mrdc-ReleaseAndAdd:
4> perform MR-DC release as specified in clause 5.3.5.10;
3> if the received mrdc-SecondaryCellGroup is set to nr-SCG:
4> perform the RRC reconfiguration according to 5.3.5.3 for the RRCReconfiguration message included in nr-SCG;
3> if the received mrdc-SecondaryCellGroup is set to eutra-SCG:
4> perform the RRC connection reconfiguration as specified in TS 36.331, clause 5.3.5.3 for the RRCConnectionReconfiguration message included in eutra-SCG;
2> else (mrdc-SecondaryCellGroupConfig is set to release):
3> perform MR-DC release as specified in clause 5.3.5.10;

-continued

1> if the RRCReconfiguration message includes the radioBearerConfig:
2> perform the radio bearer configuration according to 5.3.5.6;
1> if the RRCReconfiguration message includes the radioBearerConfig2:
2> perform the radio bearer configuration according to 5.3.5.6;
1> if the RRCReconfiguration message includes the measConfig:
2> perform the measurement configuration procedure as specified in 5.5.2;
1> if the RRCReconfiguration message includes the dedicatedNAS-MessageList:
2> forward each element of the dedicatedNAS-MessageList to upper layers in the same order as listed;
1> if the RRCReconfiguration message includes the dedicatedSIB1-Delivery:
2> perform the action upon reception of SIB1 as specified in 5.2.2.4.2;
It is noted that if this RRCReconfiguration is associated to the MCG and includes reconfigurationWithSync in spCellConfig and dedicatedSIB1-Delivery, the UE initiates (if needed) the request to acquire required SIBs, according to clause 5.2.2.3.5, only after the random access procedure towards the target SpCell is completed.
1> if the RRCReconfiguration message includes the dedicatedSystemInformationDelivery:
2> perform the action upon reception of System Information as specified in 5.2.2.4;
1> if the RRCReconfiguration message includes the dedicatedPosSysInfoDelivery:
2> perform the action upon reception of the contained posSIB(s), as specified in sub-clause 5.2.2.4.16;
1> if the RRCReconfiguration message includes the otherConfig:
2> perform the other configuration procedure as specified in 5.3.5.9;
1> if the RRCReconfiguration message includes the bap-Config:
2> perform the BAP configuration procedure as specified in 5.3.5.12;
1> if the RRCReconfiguration message includes the iab-IP-AddressConfigurationList:
2> if iab-IP-AddressToReleaseList is included:
3> perform release of IP address as specified in 5.3.5.12a.1.1;
2> if iab-IP-AddressToAddModList is included:
3> perform IAB IP address addition/update as specified in 5.3.5.12a.1.2;
1> if the RRCReconfiguration message includes the conditionalReconfiguration:
2> perform conditional reconfiguration as specified in 5.3.5.13;
1> if the RRCReconfiguration message includes the needForGapsConfigNR:
2> if needForGapsConfigNR is set to setup:
3> consider itself to be configured to provide the measurement gap requirement information of NR target bands;
2> else:
3> consider itself not to be configured to provide the measurement gap requirement information of NR target bands;
1> else if the RRCReconfiguration message was received via SRB3 (UE in NR-DC):
2> if the RRCReconfiguration message was received within DLInformationTransferMRDC:
3> if the RRCReconfiguration message was received within the nr-SCG within mrdc-SecondaryCellGroup (NR SCG RRC Reconfiguration):
4> if reconfigurationWithSync was included in spCellConfig in nr-SCG:
5> initiate the Random Access procedure on the primary and secondary cells ("PSCell"), as specified in TS 38.321;
4> else:
5> the procedure ends;
3> else:
4> submit the RRCReconfigurationComplete message via SRB1 to lower layers for transmission using the new configuration;
2> else:
3> submit the RRCReconfigurationComplete message via SRB3 to lower layers for transmission using the new configuration;
1> else (RRCReconfiguration was received via SRB1):
2> submit the RRCReconfigurationComplete message via SRB1 to lower layers for transmission using the new configuration;
2> if this is the first RRCReconfiguration message after successful completion of the RRC re-establishment procedure:
3> resume SRB2 and DRBs that are suspended;
1> if reconfigurationWithSync was included in spCellConfig of an MCG or SCG, and when MAC of an NR cell group successfully completes a Random Access procedure triggered above:
2> stop timer T304 for that cell group;
2> stop timer T310 for source SpCell if running;
2> apply the parts of the CSI reporting configuration, the scheduling request configuration and the sounding RS configuration that do not require the UE to know the SFN of the respective target SpCell, if any;
2> apply the parts of the measurement and the radio resource configuration that require the UE to know the SFN of the respective target SpCell (e.g., measurement gaps, periodic CQI reporting, scheduling request configuration, sounding RS configuration), if any, upon acquiring the SFN of that target SpCell;
2> for each DRB configured as DAPS bearer, request uplink data switching to the PDCP entity, as specified in TS 38.323;
2> if the reconfigurationWithSync was included in spCellConfig of an MCG:

-continued

3> if timer T390 is running:
4> stop timer T390 for all access categories;
4> perform the actions as specified in 5.3.14.4.
3> if timer T350 is running:
4> stop timer T350;
3> if RRCReconfiguration does not include dedicatedSIB1-Delivery and
3> if the active downlink BWP, which is indicated by the firstActiveDownlinkBWP-Id for the target SpCell of the MCG, has a common search space configured by searchSpaceSIB1:
4> acquire the SIB1, which is scheduled as specified in TS 38.213, of the target SpCell of the MCG;
4> upon acquiring SIB1, perform the actions specified in clause 5.2.2.4.2;
2> if the reconfigurationWithSync was included in spCellConfig of an MCG; or:
2> if the reconfigurationWithSync was included in spCellConfig of an SCG and the CPC was configured
3> remove all the entries within VarConditionalReconfig, if any;
3> for each measId of the source SpCell configuration, if the associated reportConfig has a reportType set to condTriggerConfig:
4> for the associated reportConfigId:
5> remove the entry with the matching reportConfigId from the reportConfigList within the VarMeasConfig;
4> if the associated measObjectId is only associated to a reportConfig with reportType set to condTriggerConfig:
5> remove the entry with the matching measObjectId from the measObjectList within the VarMeasConfig;
4> remove the entry with the matching measId from the measIdList within the VarMeasConfig;
2> if reconfigurationWithSync was included in masterCellGroup or secondaryCellGroup; and
2> if the UE initiated transmission of a UEAssistanceInformation message for the corresponding cell group during the last 1 second, and the UE is still configured to provide the concerned UE assistance information for the corresponding cell group:
3> initiate transmission of a UEAssistanceInformation message for the corresponding cell group in accordance with clause 5.7.4.3 to provide the concerned UE assistance information;
3> start or restart the prohibit timer (if exists) associated with the concerned UE assistance information with the timer value set to the value in corresponding configuration;
2> if SIB12 is provided by the target primary cell ("PCell"); and the UE initiated transmission of a SidelinkUEInformationNR message indicating a change of NR sidelink communication related parameters relevant in target PCell (i.e., change of sl-RxInterestedFreqList or sl-TxResourceReqList) during the last 1 second preceding reception of the RRCReconfiguration message including reconfigurationWithSync in spCellConfig of an MCG:
3> initiate transmission of the SidelinkUEInformationNR message in accordance with 5.8.3.3;
2> the procedure ends.

It is noted that the UE is only required to acquire broadcasted SIB1 if the UE can acquire it without disrupting unicast data reception, e.g., the broadcast and unicast beams are quasi co-located.

It is further noted that the UE sets the content of UEAssistanceInformation according to latest configuration (i.e., the configuration after applying the RRCReconfiguration message) and latest UE preference. The UE may include more than the concerned UE assistance information within the UEAssistanceInformation according to 5.7.4.2. Therefore, the content of UEAssistanceInformation message might not be the same as the content of the previous UEAssistanceInformation message.

Regarding timer T304 expiry (Reconfiguration with sync failure), the UE shall:

1> if T304 of the MCG expires:
2> release dedicated preambles provided in rach-ConfigDedicated if configured;
2> release dedicated msgA PUSCH resources provided in rach-ConfigDedicated if configured;
2> if any DAPS bearer is configured, and radio link failure is not detected in the source PCell, according to subclause 5.3.10.3:
3> reset MAC for the target PCell and release the MAC configuration for the target PCell;
3> for each DAPS bearer:
4> release the RLC entity or entities as specified in TS 38.322, clause 5.1.3, and the associated logical channel for the target PCell;
4> reconfigure the PDCP entity to release DAPS as specified in TS 38.323;
3> for each SRB:
4> if the masterKeyUpdate was not received:

-continued

5> configure the PDCP entity for the source PCell with state variables continuation as specified in TS 38.323, the state variables as the PDCP entity for the target PCell;
4> release the PDCP entity for the target PCell;
4> release the RLC entity as specified in TS 38.322, clause 5.1.3, and the associated logical channel for the target PCell;
4> trigger the PDCP entity for the source PCell to perform SDU discard as specified in TS 38.323;
4> re-establish the RLC entity for the source PCell;
3> release the physical channel configuration for the target PCell;
3> revert back to the SDAP configuration used in the source PCell;
3> discard the keys used in target PCell (the $K_{gNB}$ key, the $K_{RRCenc}$ key, the $K_{RRCint}$ key, the $K_{UPint}$ key and the $K_{UPenc}$ key), if any;
3> resume suspended SRBs in the source PCell;
3> for each non DAPS bearer:
4> revert back to the UE configuration used for the DRB in the source PCell, includes PDCP, RLC states variables, the security configuration and the data stored in transmission and reception buffers in PDCP and RLC entities;
3> revert back to the UE measurement configuration used in the source PCell;
3> initiate the failure information procedure as specified in subclause 5.7.5 to report DAPS handover failure.
2> else:
3> revert back to the UE configuration used in the source PCell;
3> store the handover failure information in VarRLF-Report as described in the subclause 5.3.10.5;
3> initiate the connection re-establishment procedure as specified in subclause 5.3.7.

It is noted that in the context above, "the UE configuration" includes state variables and parameters of each radio bearer.

1> else if timer T304 of a secondary cell group expires:
2> if MCG transmission is not suspended:
3> release dedicated preambles provided in rach-ConfigDedicated, if configured;
3> initiate the SCG failure information procedure as specified in subclause 5.7.3 to report SCG reconfiguration with sync failure, upon which the RRC reconfiguration procedure ends;
2> else:
3> if the UE is in NR-DC:

-continued

4> initiate the connection re-establishment procedure as specified in subclause 5.3.7;
3> else (the UE is in (NG) EN-DC):
4> initiate the connection re-establishment procedure as specified in TS 36.331, subclause 5.3.7;
1> else if timer T304 expires when RRCReconfiguration is received via other RAT (HO to NR failure):
2> reset MAC;
2> perform the actions defined for this failure case as defined in the specifications applicable for the other RAT.

It is noted that the term 'handover failure' has been used to refer to 'reconfiguration with sync failure'.

Regarding full configuration, the UE shall:

1> release/ clear all current dedicated radio configurations except for the following:
- the MCG cell radio network temporary identifier ("C-RNTI");
- the AS security configurations associated with the master key;

It is noted that radio configuration is not just the resource configuration but includes other configurations like MeasConfig. In case NR-DC or NE-DC is configured, this also includes the entire NR or E-UTRA SCG configuration which are released according to the MR-DC release procedure as specified in 5.3.5.10. The radio configuration does not include SRB1/SRB2 configurations and DRB configurations as configured by radioBearerConfig or radioBearerConfig2.

Further, it is noted that for NR sidelink communication, the radio configuration includes the sidelink RRC configuration received from the network, but does not include the sidelink RRC reconfiguration and sidelink UE capability received from other UEs via PC5-RRC. In addition, the UE considers the new NR sidelink configurations as full configuration, in case of state transition and change of system information used for NR sidelink communication.

- the logged measurement configuration;

1> if the spCellConfig in the masterCellGroup includes the reconfigurationWithSync (i.e., SpCell change):
2> release/ clear all current common radio configurations;
2> use the default values specified in 9.2.3 for timers T310, T311 and constants N310, N311;
1> else (full configuration after re-establishment or during RRC resume):
2> use values for timers T301, T310, T311 and constants N310, N311, as included in ue-TimersAndConstants received in SIB1;
1> apply the default L1 parameter values as specified in corresponding physical layer specifications except for the following:
- parameters for which values are provided in SIB1;

1> apply the default MAC Cell Group configuration as specified in 9.2.2;

-continued

```
1> for each srb-Identity value included in the srb-ToAddModList (SRB reconfiguration):
    2> apply the default SRB configuration defined in 9.2.1 for the corresponding
    SRB;
        It is noted that this is to get the SRBs (SRB1 and SRB2 for reconfiguration
    with sync and SRB2 for resume and reconfiguration after re-establishment) to a
    known state from which the reconfiguration message can do further
    configuration.
1> for each pdu-Session that is part of the current UE configuration:
    2> release the SDAP entity (clause 5.1.2 in TS 37.324);
    2> release each DRB associated to the pdu-Session as specified in 5.3.5.6.4;
        It is noted that this will retain the pdu-Session but remove the DRBs including
  drb-identity of these bearers from the current UE configuration. Setup of the DRBs
  within the AS is described in clause 5.3.5.6.5 using the new configuration. The pdu-
  Session acts as the anchor for associating the released and re-setup DRB. In the AS
  the DRB re-setup is equivalent with a new DRB setup (including new PDCP and
  logical channel configurations).
1> for each pdu-Session that is part of the current UE configuration but not added with
same pdu-Session in the drb-ToAddModList:
    2> if the procedure was triggered due to reconfiguration with sync:
            3> indicate the release of the user plane resources for the pdu-Session to
            upper layers after successful reconfiguration with sync;
    2> else:
            3> indicate the release of the user plane resources for the pdu-Session to
            upper layers immediately;
```

Regarding VarConditionalReconfig, the UE variable VarConditionalReconfig includes the accumulated configuration of the conditional handover or conditional PSCell change configurations including the pointers to conditional handover or conditional PSCell change execution condition (associated measId(s)) and the stored target candidate SpCell RRCReconfiguration.

Regarding CondReconfigToAddModList, the IE CondReconfigToAddModList concerns a list of conditional reconfigurations to add or modify, with for each entry the condReconfigId and the associated condExecutionCond and condRRCReconfig.

As briefly discussed above, the subject matter herein presents detailed signaling methods to enable group-based serving cell change. Regarding group handover configuration and command, throughout this document, a handover refers to a change of a special cell (SpCell) (e.g., PCell of MCG or PSCell of SCG).

In one embodiment, a UE receives a group handover configuration e.g., in an RRCReconfiguration message, that includes information of a group identity and a UE index (or UE identity) within a group. Additionally, the UE may receive a physical downlink control channel ("PDCCH") monitoring configuration (e.g., a search space and a corresponding control resource set ("CORESET") and a downlink control information ("DCI") format) associated with a group common PDCCH for a group handover.

For example, the UE receives information of a first RNTI (e.g., C-RNTI, MCS-C-RNTI) used for unicast communications in one or more serving cells and information of a second RNTI (e.g., Group (G)-RNTI) and the UE index/identity associated with a group handover command. The UE further receives a group handover command based on the configured group identity (e.g., G-RNTI) and determines whether to perform a handover to a target cell based on the received group handover command. For example, the UE determines to perform a handover if a handover parameter set addressed to the UE (e.g., using the UE index/identity) is included in the group handover command. In another example, the UE determines to perform a handover if a handover parameter set addressed to the UE is included in a conditional group handover command and if one or more conditions (e.g., measurements, timing, or the like) configured for a conditional handover is satisfied. In one embodiment, in response to determining to perform the handover to the target cell, the UE identifies parameters associated with the target cell, e.g., a new UE identity (e.g., a new C-RNTI used in the target cell), a dedicated RACH resource(s), a first active DL BWP, a first active UL BWP, and/or the like), from the received group handover command based on the UE index/identity within the group.

In one implementation, a network entity determines a group of UEs for a group mobility configuration based on UE locations, UE geometry, spatial coverage, supported services/slices, and/or the like. For example, the network entity may send a group handover command to the group of UEs since the source cell does not support a specific slice/service or does not support a specific slice/service at the time of handover. In another example, the network entity may send a group handover command to a group of UEs to move to a target cell based on the supported services/slices of the target cell and the services/slices requirement of the group of UEs, e.g., services/slices requirement of the UEs are satisfied by the target cell.

In one implementation, if a UE initiates a handover to a target cell upon receiving a group handover command, the UE may initiate a random access procedure unless a handover with skipping the random access procedure and reusing one of maintained uplink timing information (e.g., timing advance values) is indicated. Upon successful completion of the random access procedure (within a configured time duration, e.g., completion before expiration of the T304A timer), in one embodiment, the UE may apply group-specific configured measurement and/or radio resource configuration (e.g., measurement gap, group-specific BWP configurations). Further, in one embodiment, the UE may acquire SIB1 if an active DL BWP of a target SpCell of an MCG configured for the UE (e.g., firstActiveDownlinkBWP-Id configured for the UE) has a common search space configured by searchSpaceSIBI. The UE may remove all the entries within VarConditionalReconfig if receiving a conditional group handover command (e.g., groupConditionalReconfiguration included in GroupRRCReconfiguration message).

In one example, a group handover command is delivered via a group-common PDCCH, which may carry scheduling information of a physical downlink shared channel ("PDSCH"), and the scheduled PDSCH, where the group-common PDCCH includes cyclic redundancy check ("CRC") bits scrambled with a group identity (e.g., G-RNTI). As shown in Example 1 below, the corresponding PDSCH carries a group RRC reconfiguration message (e.g., a GroupRRCReconfiguration message) that includes a GroupBasedCellGroupConfig IE for an MCG. If the GroupBasedCellGroupConfig IE for the MCG includes an indication of SpCell reconfiguration with synchronization (e.g. the parameter groupSpCellConfig with the parameter groupReconfigurationWithSync), the UE further checks whether the parameter groupReconfigurationWithSync includes handover related resources (e.g., a cell-ID, a new RNTI, a dedicated RACH resource, first active DL/UL BWPs spatial information (e.g., TCI-state, source reference signal(s) (e.g., SSB), quasi-collocation relationship information (e.g., QCL type parameter(s)) associated with the first active BWPs, and/or the like) for the UE, e.g. the parameter mobilityConfigList intended for the UE. The UE, in one embodiment, maintains a MAC entity and a set of logical channels with associated RLC entities of a current configuration. The UE may release all configured SCells in the current configuration to ease the admission control of a target gNB.

In one example, a UE determines when to start monitoring a group-common PDCCH to receive a group handover command based on broadcasted timing information e.g., based on when a cell is going to stop serving the area or based on an indicated time duration [t1, t2], which may be determined by the network e.g., based on trajectory of satellites in NTN, mobile-IAB node, and/or the like. This trajectory information may be computed based on at least one piece of ephemeris information, which may be actual or nominal or a combination thereof and determined by a specification, configuration, or implementation. In addition, the determining may be additionally based on the location of GWs or other terrestrial or non-terrestrial nodes involved in a handover. In the case that the node(s) are mobile, their location may be computed based on a trajectory obtained by actual or nominal ephemeris of the node(s) or a combination thereof. In another example, a UE receives a search space set activation/deactivation indication (e.g., via MAC CE or DCI) for a search space set associated with a group-common PDCCH of a group handover command, and initiates/stops monitoring the group-common PDCCH of the group handover command based on the received search space set activation/deactivation indication.

In one example, a UE considers the source cell in response to receiving the group handover command as barred, since the source cell will not be available any further e.g., due to a network node being turned off. The UE may not, after execution of the handover triggered by the group handover command, attempt to re-establish RRC connection to this source cell. For cases when groups of UEs are handed over to a different cell for the purpose of e.g., network energy saving, UEs shall not reselect this source cell or try to re-establish to this source cell in case of handover failure. In one example, source cell barring is explicitly indicated by one information element ("IE") in the group handover message, e.g., whether UEs shall consider the source cell as barred after the handover, e.g., the UE shall not return to source cell. In one implementation, the UE does not expect to receive a group handover command or does not expect to receive a group handover command with an indication of source cell barring, if the UE is configured with DAPS operation.

In one example involving GroupRRCReconfiguration message and GroupBasedCellGroupConfig IE, the GroupRRCReconfiguration message is the command to modify an RRC connection for a group of UEs. It may convey information for group-specific measurement configuration, group-based mobility control, and group-specific radio resource configuration (excluding MAC configuration and radio bearers).

FIG. 3 depicts one example embodiment of a GroupRRCReconfiguration message IE. Table 1 defines various elements of the GroupRRCReconfiguration message IE. In one example embodiment, the following settings may be applicable:

Signaling radio bearer: SRB1 or SRB3
RLC-SAP: AM
Logical channel: DCCH
Direction: Network to UE

TABLE 1

| GroupRRCReconfiguration-IEs field descriptions |
|---|
| dedicatedPosSysInfoDelivery<br>This field is used to transfer SIBPos to the UE in RRC_CONNECTED. |
| dedicatedSIB1-Delivery<br>This field is used to transfer SIB1 to the UE. The field has the same values as the corresponding configuration in servingCellConfigCommon. |
| dedicatedSystemInformationDelivery<br>This field is used to transfer SIB6, SIB7, SIB8 to the UE with an active BWP with no common serach space configured. For UEs in RRC_CONNECTED, this field is used to transfer the SIBs requested on-demand. |
| fullConfig<br>Indicates that the full configuration option is applicable for the GroupRRCReconfiguration message for intra-system intra-RAT HO. For inter-RAT HO from E-UTRA to NR, fullConfig indicates whether or not delta signalling of SDAP/PDCP from source RAT is applicable. This field is absent if any DAPS bearer is configured or when the GroupRRCReconfiguration message is transmitted on SRB3, and in an GroupRRCReconfiguration message contained in another GroupRRCReconfiguration message (or GroupRRCConnectionReconfiguration message) transmitted on SRB1. |
| masterCellGroup<br>Configuration of master cell group. |
| needForGapsConfigNR<br>Configuration for the group of UEs to report measurement gap requirement information of NR target bands in the GroupRRCReconfigurationComplete message. |
| onDemandSIB-Request<br>If the field is present, the UE is allowed to request SIB(s) on-demand while in RRC_CONNECTED. |
| onDemandSIB-RequestProhibitTimer |

TABLE 1-continued

| GroupRRCReconfiguration-IEs field descriptions |
| --- |
| Prohibit timer for requesting SIB(s) on-demand while in RRC_CONNECTED. Value in seconds. Value s0 means prohibit timer is set to 0 seconds, value s0dot5 means prohibit timer is set to 0.5 seconds, value s1 means prohibit timer is set to 1 second and so on. |
| t316 |
| Indicates the value for timer T316. Value ms50 corresponds to 50 ms, value ms100 corresponds to 100 ms and so on. This field can be configured only if the UE is configured with split SRB1 or SRB3. |

FIGS. 4A and 4B depict one example embodiment of a GroupBasedCellGroupConfig IE, which is used to configure a primary cell (e.g., SpCell) of an MCG or SCG for a group of UEs. Table 2 defines various elements of the GroupBasedCellGroupConfig IE.

TABLE 2

| GroupBasedCellGroupConfig field descriptions |
| --- |
| reportUplinkTxDirectCurrent |
| Enables reporting of uplink and supplementary uplink Direct Current location information upon BWP configuration and reconfiguration. This field is only present when the BWP configuration is modified or any serving cell is added or removed. This field is absent in the IE CellGroupConfig when provided as part of RRCSetup message. If UE is configured with SUL carrier, UE reports both UL and SUL Direct Current locations. |
| rlmInSyncOutOfSyncThreshold |
| BLER threshold pair index for IS/OOS indication generation. n1 corresponds to the value 1. When the field is absent, the UE applies the value 0. Whenever this is reconfigured, UE resets N310 and N311, and stops T310, if running. Network does not include this field. |
| spCellConfig |
| Parameters for the SpCell of this cell group (PCell of MCG or PSCell of SCG). |
| mobilityConfigList |
| Handover related parameters intended to a UE configured with a UE index UE-IndexforGroupMobility. |
| firstActiveDownlinkBWP-Id, firstActiveUplinkBWP-Id |
| This field contains the ID of the DL/UL BWP to be activated upon performing the group RRC (re-)configuration. If the field is absent, the group RRC (re-)configuration does not impose a BWP switch. The network sets the firstActiveDownlinkBWP-Id and firstActiveUplinkBWP-Id to the same value. |

In one implementation, a UE receives a plurality of T304A timer values (see Table 3 below) in a group handover command message and selects a T304A timer value intended for the UE from the plurality of T304A timer values. For example, a UE-specific T304A timer value is included in the parameter mobilityConfigList intended for the UE. Further, the UE may receive a UE-specific T304A timer starting time offset (e.g., the UE starts the T304A timer and initiates the handover when the indicated starting time offset elapsing after reception of GroupRRCReconfiguration message including groupReconfigurationWithSync).

In one embodiment, different handover initiation times for different UEs in the group can solve a potential PRACH capacity issue in a target cell due to handover of a large number of UEs. In one example, a time range, e.g., maximum time, (e.g., common to the group of UEs) for executing the handover is signaled within the group handover command. Individual UEs may determine a random value within the signaled time range (e.g., to determine the UE-specific T304A timer starting time offset) to start the handover execution phase. In some realizations, the timer plus UE-specific offset may or may not take into account different propagation times associated with different UEs. If the range of propagation times is large or highly variable, the UE may be required to take the variable propagation delay into account when determining the UE-specific RACH timing.

In another implementation, a UE receives a reference T304A timer value and applies an offset value to the reference T304A timer value. The offset value may be determined based on a UE index (e.g., UE-IndexforGroupMobility) within a UE group for a group handover command from a predefined or configured plurality of offset values.

TABLE 3

| Timer | Start | Stop | At expiry |
| --- | --- | --- | --- |
| T304A | Upon reception of GroupRRCReconfiguration message including groupReconfigurationWithSync or upon conditional reconfiguration execution i.e., when applying a stored GroupRRCReconfiguration message including groupReconfigurationWithSync. If a T304A start time offset value is indicated, upon the indicated T304A start time offset value | Upon successful completion of random access on the corresponding SpCell For T304A of SCG, upon SCG release | For T304A of MCG, in case of the handover from NR or intra-NR handover, initiate the RRC re-establishment procedure; In case of handover to NR, perform the actions defined in the specifications applicable for the source RAT. If any DAPS bearer is |

TABLE 3-continued

| Timer | Start | Stop | At expiry |
|---|---|---|---|
| | elapsing after reception of GroupRRCReconfiguration message including groupReconfigurationWithSync | | configured and if there is no RLF in source PCell, initiate the failure information procedure. For T304A of SCG, inform network about the reconfiguration with sync failure by initiating the SCG failure information procedure as specified in 5.7.3 of TS 38.331 |

In one implementation, a UE keeps its MAC configuration, RLC bearer configuration, logical channel configurations, DRB configurations, and SRB configurations upon receiving a GroupRRCReconfiguration message. If the parameter 'fullConfig' is included in the GroupRRCReconfiguration message, in one embodiment, the UE resets its SRB configurations to default SRB configurations but maintains the current DRB configurations.

Example—Full configuration procedure in a group handover. The UE shall:

---

1> release/ clear all current dedicated radio configurations except for the following:
- the MCG C-RNTI;
- the AS security configurations associated with the master key;
- MAC configuration;
- RLC bearer configuration;
- Logical channel configurations It is noted that, in one embodiment, radio configuration is not just the resource configuration but includes other configurations like MeasConfig. In case NR-DC or NE-DC is configured, this also includes the entire NR or E-UTRA SCG configuration which are released according to the MR-DC release procedure as specified in 5.3.5.10 of TS38.331. The radio configuration does not include SRB1/SRB2 configurations and DRB configurations as configured by radioBearerConfig or radioBearerConfig2.
- the logged measurement configuration.

1> if the groupSpCellConfig in the masterCellGroup includes the groupReconfigurationWithSync (e.g., SpCell change for a group of UEs):
  2> release/ clear all current common radio configurations;
  2> use the default values specified in 9.2.3 for timers T310, T311 and constants N310, N311;

1> apply the default L1 parameter values as specified in corresponding physical layer specifications except for the following:
- parameters for which values are provided in SIB1;

1> apply the default MAC Cell Group configuration as specified in 9.2.2 of TS38.331;
1> for each srb-Identity value in the current UE configuration,
  2> apply the default SRB configuration defined in 9.2.1 of TS38.331 for the corresponding SRB;

It is noted that, in one embodiment, this is to get the SRBs (SRB1 and SRB2 for reconfiguration with sync and SRB2 for resume and reconfiguration after re-establishment) to a known state from which the reconfiguration message can do further configuration.

---

Figure 5:
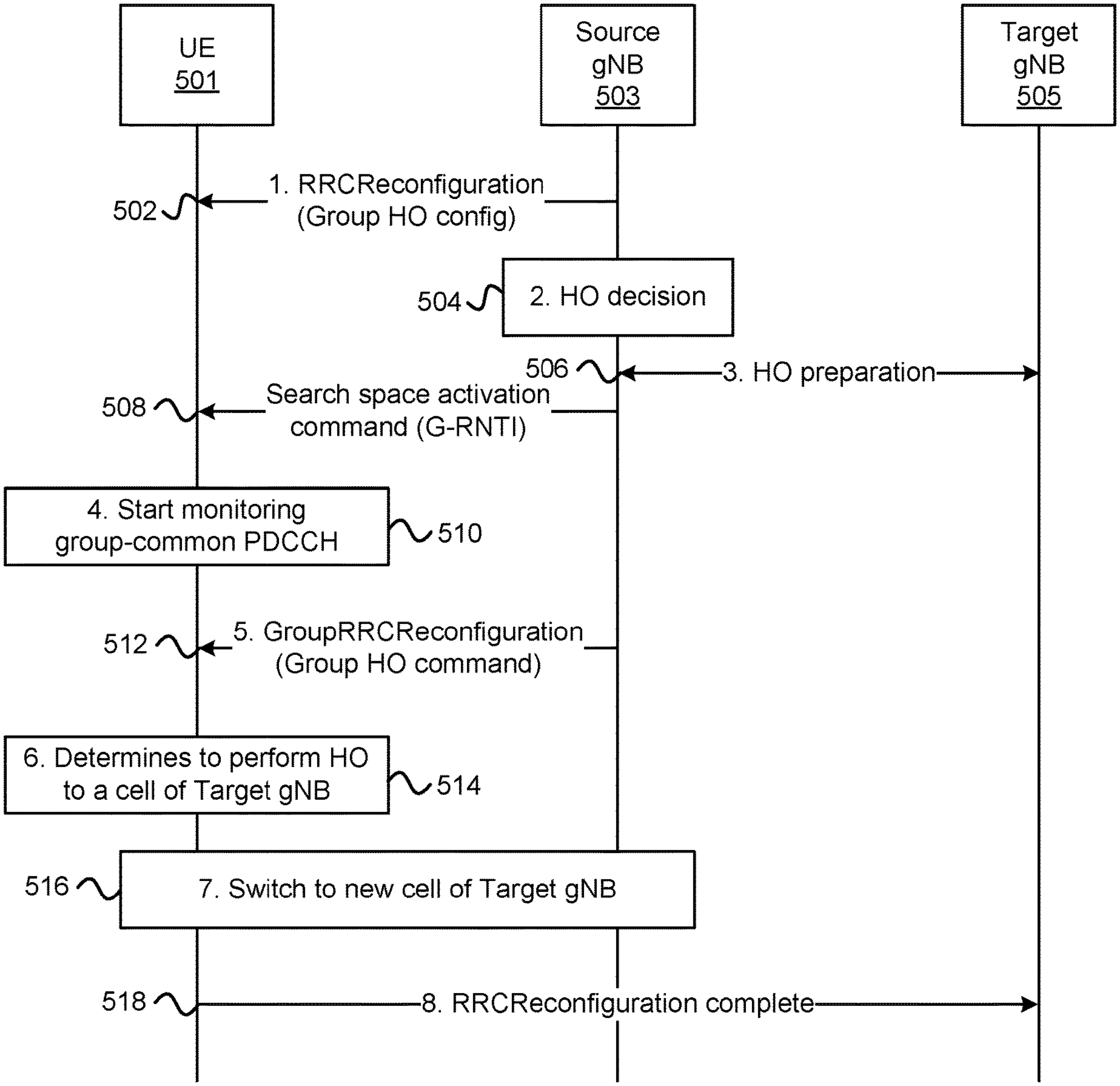
FIG. 5 depicts an example of a group-based mobility control procedure.

In an example shown in FIG. 5, a UE 501 receives an RRCReconfiguration message (see messaging 502) that includes a group handover configuration from a source gNB 503 (e.g., a source cell). The group handover configuration, in one embodiment, includes G-RNTI, a search space configuration for delivery of a group-based handover command, and a UE index within a group. When the source gNB 503 decides (see block 504) to handover the UE 501 to a target gNB 505, the source gNB 503 communicates (see messaging 506) with the target gNB 505 (e.g., transfers UE context information) for handover preparation.

Further, in one embodiment, the source gNB 503 sends (see messaging 508) a search space activation command to the UE 501 so that the UE 501 can start monitoring (see block 510) the search space related to receiving the group handover command. When the UE 501 detects a PDCCH with CRC scrambled with the G-RNTI and further receives a PDSCH carrying an GroupRRCReconfiguration message (see messaging 512), the UE 501 determines (see block 514) whether to initiate the handover and identifies handover related parameters (e.g., a new C-RNTI for a target cell) based on the decoded GroupRRCReconfiguration message. After switching (see block 516) to the target cell of the target gNB 505 (e.g., with successful completion of a random access procedure with the target cell), the UE 501 sends (see messaging 518) a RRCReconfigurationComplete message to the target gNB 505.

Figure 6:
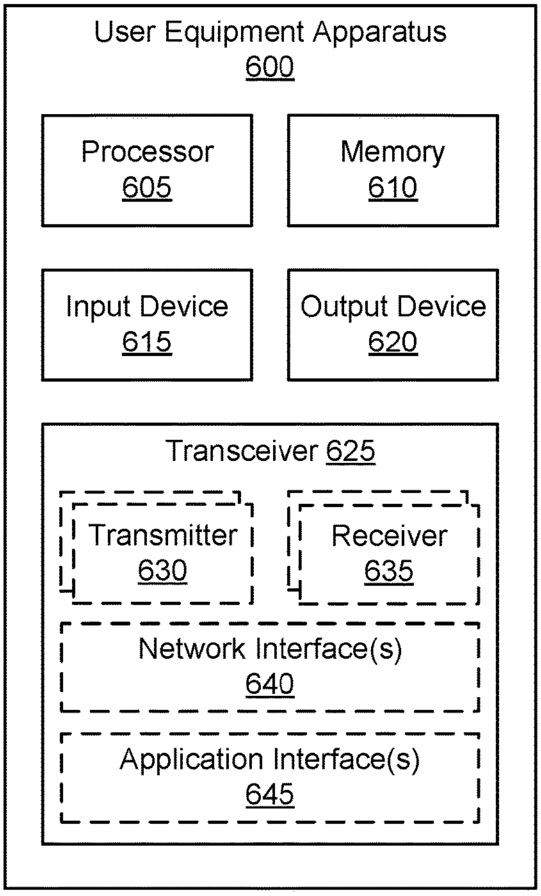
FIG. 6 is a block diagram illustrating one embodiment of a user equipment apparatus that may be used for group-based mobility configuration.

FIG. 6 depicts a user equipment apparatus 600 that may be used for group-based mobility configuration, according to embodiments of the disclosure. In various embodiments, the user equipment apparatus 600 is used to implement one or more of the solutions described above. The user equipment apparatus 600 may be one embodiment of a UE, such as the remote unit 105 and/or the UE 205, as described above. Furthermore, the user equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more base units 121. Additionally, the transceiver 625 may support at least one network interface 640 and/or application interface 645. The application interface(s) 645 may support one or more APIs. The network interface(s) 640 may support 3GPP reference points, such as Uu and PC5. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625. In certain embodiments, the processor 605 may include an application processor (also known as "main processor") which manages application-domain and operating system ("OS") functions and a baseband processor (also known as "baseband radio processor") which manages radio functions.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to CSI enhancements for higher frequencies. For example, the memory 610 may store parameters, configurations, resource assignments, policies, and the like as described above. In certain embodiments, the memory 610 also stores program code and related data, such as an operating system or other controller algorithms operating on the user equipment apparatus 600, and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all, or portions of the output device 620 may be integrated with the input device 615. For example, the input device 615 and output device 620 may form a touchscreen or similar touch-sensitive display. In other embodiments, the output device 620 may be located near the input device 615.

The transceiver 625 includes at least transmitter 630 and at least one receiver 635. The transceiver 625 may be used to provide UL communication signals to a base unit 121 and to receive DL communication signals from the base unit 121, as described herein. Similarly, the transceiver 625 may be used to transmit and receive SL signals (e.g., V2X communication), as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

In one embodiment, the processor 605 is configured to receive, via the transceiver 625, a group handover configuration comprising a first identifier and a second identifier, the first identifier for a group of UE apparatuses and the second identifier for the UE apparatus within the group of UE apparatuses. In one embodiment, the processor 605 is configured to receive, via the transceiver 625, a group handover command message based on the first identifier. In one embodiment, the processor 605 is configured to perform handover of the UE apparatus to a target cell in response to determining that the group handover command comprises handover information for the UE apparatus based on the second identifier.

In one embodiment, the first identifier is assigned to the group of UE apparatuses and the second identifier corresponds to a UE index of the UE apparatus within the group of UE apparatuses.

In one embodiment, the handover information for the UE apparatus comprises a handover parameter set in the group handover command message, the handover parameter set addressed to the UE apparatus based on the second identifier.

In one embodiment, the handover parameter set comprises at least one selected from the group comprising a new C-RNTI for a target cell, at least one dedicated PRACH resource, a first active DL BWP, a first active UL BWP, and a timer value.

In one embodiment, the processor 605 is configured to determine when to initiate the handover in response to determining to perform the handover based on a determined initiation time.

In one embodiment, the processor 605 is configured to receive, via the transceiver 625, a PDCCH monitoring configuration for the group handover command message and detect a PDCCH associated with the PDCCH monitoring configuration based on the first identity, wherein the PDCCH comprises a group-common PDCCH that schedules a PDSCH carrying the group handover command In one embodiment, the processor 605 is configured to receive, via the transceiver 625, an indication of whether a source cell is barred after the handover.

In one embodiment, the handover comprises at least one selected from the group comprising a change of a primary cell of a master cell group and a change of a primary secondary cell of a secondary cell group.

In one embodiment, the processor 605 is configured to release current dedicated radio configurations except for a MCG C-RNTI, AS security configurations associated with a master key, a MAC configuration, a RLC bearer configuration, and one or more logical channel configurations in response to the group handover command message comprising an indication of a full configuration.

Figure 7:
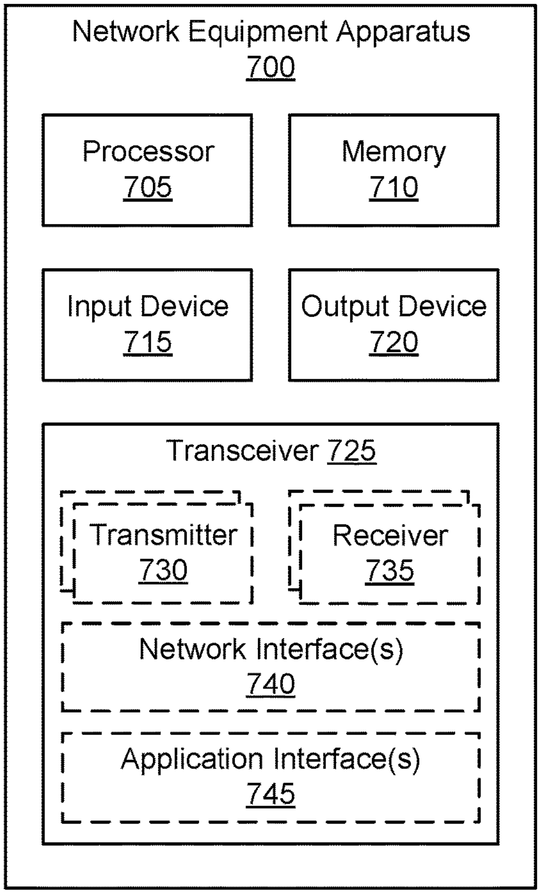
FIG. 7 is a block diagram illustrating one embodiment of a network apparatus that may be used for group-based mobility configuration.

FIG. 7 depicts one embodiment of a network apparatus 700 that may be used for group-based mobility configuration, according to embodiments of the disclosure. In some embodiments, the network apparatus 700 may be one embodiment of a RAN node and its supporting hardware, such as the base unit 121 and/or gNB, described above. Furthermore, network apparatus 700 may include a processor 705, a memory 710, an input device 715, an output device 720, and a transceiver 725. In certain embodiments, the network apparatus 700 does not include any input device 715 and/or output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs. The network interface(s) 740 may support 3GPP reference points, such as Uu, N1, N2, N3, N5, N6 and/or N7 interfaces. Other network interfaces 740 may be supported, as understood by one of ordinary skill in the art.

When implementing an NEF, the network interface(s) 740 may include an interface for communicating with an application function (i.e., N5) and with at least one network function (e.g., UDR, SFC function, UPF) in a mobile communication network, such as the mobile core network 130.

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, an FPGA, a DSP, a co-processor, an application-specific processor, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio function. In various embodiments, the processor 705 controls the network apparatus 700 to implement the above described network entity behaviors (e.g., of the gNB) for group-based mobility configuration.

The memory 710, in one embodiment, is a computer readable storage medium. In some embodiments, the memory 710 includes volatile computer storage media. For example, the memory 710 may include a RAM, including DRAM, SDRAM, and/or SRAM. In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data relating to CSI enhancements for higher frequencies. For example, the memory 710 may store parameters, configurations, resource assignments, policies, and the like as described above. In certain embodiments, the memory 710 also stores program code and related data, such as an OS or other controller algorithms operating on the network apparatus 700, and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, all, or portions of the output device 720 may be located near the input device 715.

As discussed above, the transceiver 725 may communicate with one or more remote units and/or with one or more interworking functions that provide access to one or more PLMNs. The transceiver 725 may also communicate with one or more network functions (e.g., in the mobile core network 80). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

In one embodiment, the processor 700 is configured to transmit, via the transceiver 725, to a UE apparatus, a group handover configuration comprising a first identifier and a second identifier, the first identifier for a group of UE apparatuses and the second identifier for the UE apparatus within the group of UE apparatuses. In one embodiment, the processor 705 is configured to generate a group handover command message based on the first identifier, the group handover command message comprising handover information for the UE apparatus indicated based on the second identifier. In one embodiment, the processor 705 is configured to transmit, via the transceiver 725, to the UE apparatus, the group handover command message based on the first identifier, wherein the UE apparatus performs handover of the UE apparatus to a target cell in response to determining that the group handover command comprises handover information for the UE apparatus based on the second identifier.

Figure 8:
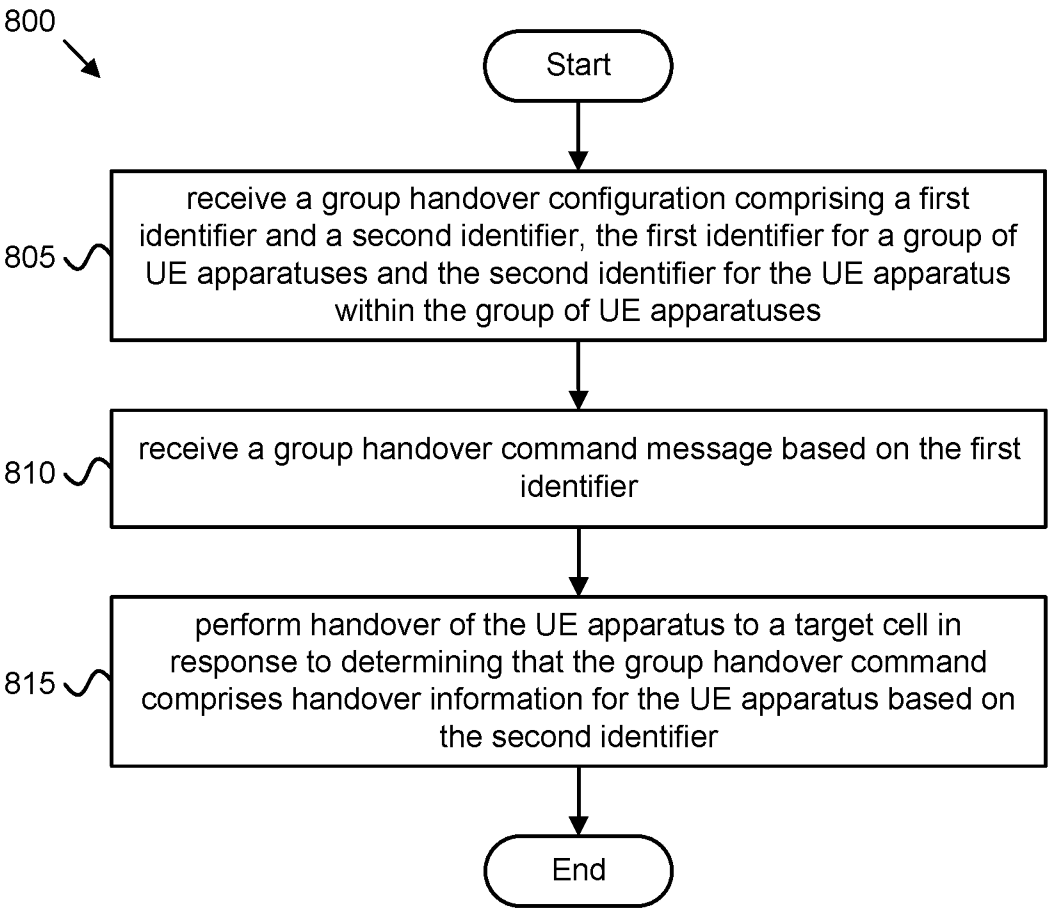
FIG. 8 is a flowchart diagram illustrating one embodiment of a method for group-based mobility configuration.

FIG. 8 is a flowchart diagram of a method 800 for group-based mobility configuration. The method 800 may be performed by a UE as described herein, for example, the remote unit 105 and/or the user equipment apparatus 600. In some embodiments, the method 800 may be performed by a processor executing program code, for example, a microcontroller, a microprocessor, a CPU, a GPU, an auxiliary processing unit, a FPGA, or the like.

In one embodiment, the method 800 begins and receives 805 a group handover configuration comprising a first identifier and a second identifier, the first identifier for a group of UE apparatuses and the second identifier for the UE apparatus within the group of UE apparatuses. In one embodiment, the method 800 receives 810 a group handover command message based on the first identifier. In one embodiment, the method 800 performs 815 handover of the UE apparatus to a target cell in response to determining that the group handover command comprises handover information for the UE apparatus based on the second identifier, and the method 800 ends.

Figure 9:
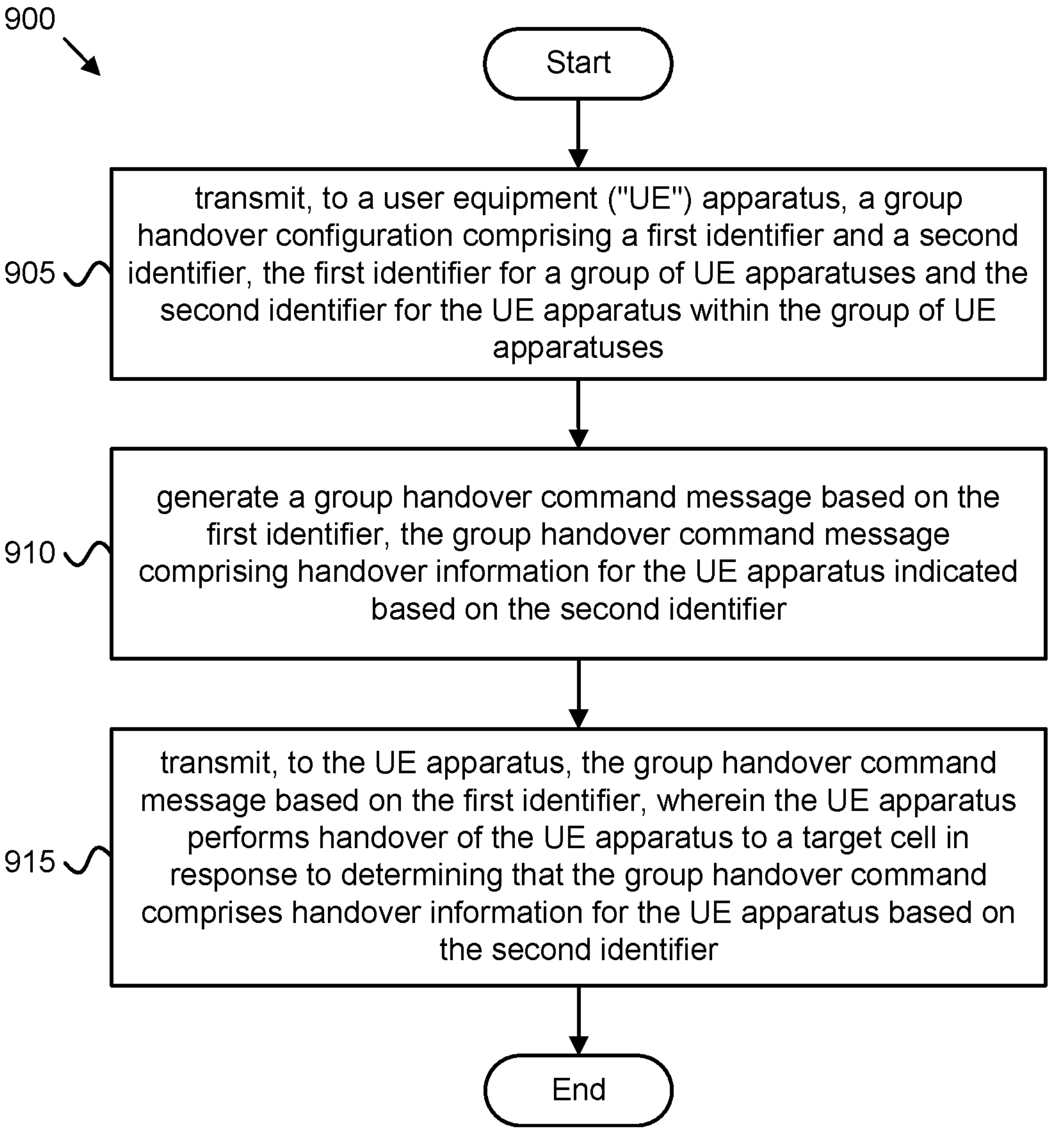
FIG. 9 is a flowchart diagram illustrating one embodiment of another method for group-based mobility configuration.

FIG. 9 is a flowchart diagram of a method 900 for group-based mobility configuration. The method 900 may be performed by a network device as described herein, for example, the gNB, the base unit 121, and/or the network equipment apparatus 700. In some embodiments, the method 900 may be performed by a processor executing program code, for example, a microcontroller, a microprocessor, a CPU, a GPU, an auxiliary processing unit, a FPGA, or the like.

In one embodiment, the method 900 begins and transmits 905, to a user equipment ("UE") apparatus, a group handover configuration comprising a first identifier and a second identifier, the first identifier for a group of UE apparatuses and the second identifier for the UE apparatus within the group of UE apparatuses. In one embodiment, the method 900 generates 910 a group handover command message based on the first identifier, the group handover command message comprising handover information for the UE apparatus indicated based on the second identifier. In one embodiment, the method 900 transmits 915, to the UE apparatus, the group handover command message based on the first identifier, wherein the UE apparatus performs handover of the UE apparatus to a target cell in response to determining that the group handover command comprises handover information for the UE apparatus based on the second identifier, and the method 900 ends.

A first apparatus is disclosed for group-based mobility configuration. The first apparatus may include a UE as described herein, for example, the remote unit 105 and/or the user equipment apparatus 600. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver and a processor coupled to the transceiver. In one embodiment, the processor is configured to cause the apparatus to receive a group handover configuration comprising a first identifier and a second identifier, the first identifier for a group of UE apparatuses and the second identifier for the UE apparatus within the group of UE apparatuses. In one embodiment, the processor is configured to cause the apparatus to receive a group handover command message based on the first identifier. In one embodiment, the processor is configured to cause the apparatus to perform handover of the UE apparatus to a target cell in response to determining that the group handover command comprises handover information for the UE apparatus based on the second identifier.

In one embodiment, the first identifier is assigned to the group of UE apparatuses and the second identifier corresponds to a UE index of the UE apparatus within the group of UE apparatuses.

In one embodiment, the handover information for the UE apparatus comprises a handover parameter set in the group handover command message, the handover parameter set addressed to the UE apparatus based on the second identifier.

In one embodiment, the handover parameter set comprises at least one selected from the group comprising a new C-RNTI for a target cell, at least one dedicated PRACH resource, a first active DL BWP, a first active UL BWP, and a timer value.

In one embodiment, the processor is configured to cause the apparatus to determine when to initiate the handover in response to determining to perform the handover based on a determined initiation time.

In one embodiment, the processor is configured to cause the apparatus to receive a PDCCH monitoring configuration for the group handover command message and detect a PDCCH associated with the PDCCH monitoring configuration based on the first identity, wherein the PDCCH comprises a group-common PDCCH that schedules a PDSCH carrying the group handover command In one embodiment, the processor is configured to cause the apparatus to receive an indication of whether a source cell is barred after the handover.

In one embodiment, the handover comprises at least one selected from the group comprising a change of a primary cell of a master cell group and a change of a primary secondary cell of a secondary cell group.

In one embodiment, the processor is configured to cause the apparatus to release current dedicated radio configurations except for a MCG C-RNTI, AS security configurations associated with a master key, a MAC configuration, a RLC bearer configuration, and one or more logical channel configurations in response to the group handover command message comprising an indication of a full configuration.

A first method is disclosed for group-based mobility configuration. The first method may be performed by a UE as described herein, for example, the remote unit 105 and/or the user equipment apparatus 600. In some embodiments, the first method may be performed by a processor executing program code, for example, a microcontroller, a microprocessor, a CPU, a GPU, an auxiliary processing unit, a FPGA, or the like.

In one embodiment, the first method receives a group handover configuration comprising a first identifier and a second identifier, the first identifier for a group of UE apparatuses and the second identifier for the UE apparatus within the group of UE apparatuses. In one embodiment, the first method receives a group handover command message based on the first identifier. In one embodiment, the first method performs handover of the UE apparatus to a target cell in response to determining that the group handover command comprises handover information for the UE apparatus based on the second identifier.

In one embodiment, the first identifier is assigned to the group of UE apparatuses and the second identifier corresponds to a UE index of the UE apparatus within the group of UE apparatuses.

In one embodiment, the handover information for the UE apparatus comprises a handover parameter set in the group handover command message, the handover parameter set addressed to the UE apparatus based on the second identifier.

In one embodiment, the handover parameter set comprises at least one selected from the group comprising a new C-RNTI for a target cell, at least one dedicated PRACH resource, a first active DL BWP, a first active UL BWP, and a timer value.

In one embodiment, the first method determines when to initiate the handover in response to determining to perform the handover based on a determined initiation time.

In one embodiment, the first method receives a PDCCH monitoring configuration for the group handover command message and detects a PDCCH associated with the PDCCH monitoring configuration based on the first identity, wherein the PDCCH comprises a group-common PDCCH that schedules a PDSCH carrying the group handover command message.

In one embodiment, the first method receives an indication of whether a source cell is barred after the handover.

In one embodiment, the handover comprises at least one selected from the group comprising a change of a primary cell of a master cell group and a change of a primary secondary cell of a secondary cell group.

In one embodiment, the first method releases current dedicated radio configurations except for a MCG C-RNTI, AS security configurations associated with a master key, a MAC configuration, a RLC bearer configuration, and one or more logical channel configurations in response to the group handover command message comprising an indication of a full configuration.

A second apparatus is disclosed for group-based mobility configuration. The second apparatus may include a network device as described herein, for example, the gNB, the base unit 121, and/or the network equipment apparatus 700. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver and a processor coupled to the transceiver. In one embodiment, the processor is configured to cause the apparatus to transmit, to a UE apparatus, a group handover configuration comprising a first identifier and a second identifier, the first identifier for a group of UE apparatuses and the second identifier for the UE apparatus within the group of UE apparatuses. In one embodiment, the processor is configured to cause the apparatus to generate a group handover command message based on the first identifier, the group handover command message comprising handover information for the UE apparatus indicated based on the second identifier. In one embodiment, the processor is configured to cause the apparatus to transmit, to the UE apparatus, the group handover command message based on the first identifier, wherein the UE apparatus performs handover of the UE apparatus to a target cell in response to determining that the group handover command comprises handover information for the UE apparatus based on the second identifier.

A second method is disclosed for group-based mobility configuration. The second method may be performed by a network device as described herein, for example, the gNB, the base unit 121, and/or the network equipment apparatus 700. In some embodiments, the second method may be performed by a processor executing program code, for example, a microcontroller, a microprocessor, a CPU, a GPU, an auxiliary processing unit, a FPGA, or the like.

In one embodiment, the second method transmits, to a UE apparatus, a group handover configuration comprising a first identifier and a second identifier, the first identifier for a group of UE apparatuses and the second identifier for the UE apparatus within the group of UE apparatuses. In one embodiment, the second method generates a group handover command message based on the first identifier, the group handover command message comprising handover information for the UE apparatus indicated based on the second identifier. In one embodiment, the second method transmits, to the UE apparatus, the group handover command message based on the first identifier, wherein the UE apparatus performs handover of the UE apparatus to a target cell in response to determining that the group handover command comprises handover information for the UE apparatus based on the second identifier.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE"), comprising:
at least one memory; and
at least one processor coupled with the at least one memory and configured to cause the UE to:
receive a group handover configuration comprising a first identifier and a second identifier, the first identifier for a group of UEs and the second identifier comprising a UE index of the UE within the group of UEs;
receive a group handover command message based on the first identifier; and
perform handover of the UE to a target cell in response to determining that the group handover command message comprises handover information for the UE based on the second identifier.

2. The UE of claim 1, wherein the first identifier is a group radio network temporary identifier (G-RNTI) assigned to the group of UEs.

3. The UE of claim 1, wherein the handover information for the UE comprises a handover parameter set in the group handover command message, the handover parameter set addressed to the UE based on the second identifier.

4. The UE of claim 3, wherein the handover parameter set comprises at least one selected from the group comprising a new cell radio network temporary identifier ("C-RNTI") for the target cell, at least one dedicated physical random access channel ("PRACH") resource, a first active downlink ("DL") bandwidth part ("BWP"), a first active uplink ("UL") BWP, and a timer value.

5. The UE of claim 1, wherein the at least one processor is configured to cause the UE to determine when to initiate the handover in response to determining to perform the handover based on a determined initiation time.

6. The UE of claim 1, wherein the at least one processor is configured to cause the UE to:
receive a physical downlink control channel ("PDCCH") monitoring configuration for the group handover command message; and
detect a PDCCH associated with the PDCCH monitoring configuration based on the first identifier,
wherein the PDCCH comprises a group-common PDCCH that schedules a physical downlink shared channel ("PDSCH") carrying the group handover command message.

7. The UE of claim 1, wherein the at least one processor is configured to cause the UE to receive an indication of whether a source cell is barred after the handover.

8. The UE of claim 1, wherein the handover comprises at least one selected from the group comprising a change of a primary cell of a master cell group and a change of a primary secondary cell of a secondary cell group.

9. The UE of claim 1, wherein the at least one processor is configured to cause the UE to release current dedicated radio configurations except for a master cell group ("MCG") cell radio network temporary identifier ("C-RNTI"), access stratum ("AS") security configurations associated with a master key, a medium access control ("MAC") configuration, a radio link control ("RLC") bearer configuration, and one or more logical channel configurations in response to the group handover command message comprising an indication of a full configuration.

10. A method of a user equipment ("UE"), comprising:
receiving a group handover configuration comprising a first identifier and a second identifier, the first identifier for a group of UEs and the second identifier comprising a UE index of the UE within the group of UEs;
receiving a group handover command message based on the first identifier; and
performing handover of the UE to a target cell in response to determining that the group handover command message comprises handover information for the UE based on the second identifier.

11. The method of claim 10, wherein the first identifier is a group radio network temporary identifier (G-RNTI) assigned to the group of UEs.

12. The method of claim 10, wherein the handover information for the UE comprises a handover parameter set in the group handover command message, the handover parameter set addressed to the UE based on the second identifier.

13. The method of claim 12, wherein the handover parameter set comprises at least one selected from the group comprising a new cell radio network temporary identifier ("C-RNTI") for the target cell, at least one dedicated physical random access channel ("PRACH") resource, a first active downlink ("DL") bandwidth part ("BWP"), a first active uplink ("UL") BWP, and a timer value.

14. The method of claim 10, further comprising determining when to initiate the handover in response to determining to perform the handover based on a determined initiation time.

15. The method of claim 10, further comprising:
receiving a physical downlink control channel ("PDCCH") monitoring configuration for the group handover command message; and
detecting a PDCCH associated with the PDCCH monitoring configuration based on the first identifier,
wherein the PDCCH comprises a group-common PDCCH that schedules a physical downlink shared channel ("PDSCH") carrying the group handover command message.

16. The method of claim 10, further comprising receiving an indication of whether a source cell is barred after the handover.

17. The method of claim 10, wherein the handover comprises at least one selected from the group comprising a change of a primary cell of a master cell group and a change of a primary secondary cell of a secondary cell group.

18. The method of claim 10, further comprising releasing current dedicated radio configurations except for a master cell group ("MCG") cell radio network temporary identifier ("C-RNTI"), access stratum ("AS") security configurations associated with a master key, a medium access control ("MAC") configuration, a radio link control ("RLC") bearer configuration, and one or more logical channel configurations in response to the group handover command message comprising an indication of a full configuration.

19. A network equipment ("NE"), comprising:

at least one memory; and at least one processor coupled with the at least one memory and configured to cause the NE to:

transmit, to a user equipment ("UE"), a group handover configuration comprising a first identifier and a second identifier, the first identifier for a group of UEs and the second identifier comprising a UE index of the UE within the group of UEs;

generate a group handover command message based on the first identifier, the group handover command message comprising handover information for the UE indicated based on the second identifier; and transmit, to the UE, the group handover command message based on the first identifier, wherein the UE performs handover of the UE to a target cell in response to determining that the group handover command message comprises handover information for the UE based on the second identifier.

20. A method performed by a network equipment ("NE"), comprising:

transmitting, to a user equipment ("UE"), a group handover configuration comprising a first identifier and a second identifier, the first identifier for a group of UEs and the second identifier comprising a UE index of the UE within the group of UEs;

generating a group handover command message based on the first identifier, the group handover command message comprising handover information for the UE indicated based on the second identifier; and transmitting, to the UE, the group handover command message based on the first identifier, wherein the UE performs handover of the UE to a target cell in response to determining that the group handover command message comprises handover information for the UE based on the second identifier.

* * * * *